US012691905B2

(12) United States Patent
Chilton

(10) Patent No.: US 12,691,905 B2
(45) Date of Patent: Jul. 28, 2026

(54) METHODS AND SYSTEMS FOR LEARNING SAFE DRIVING PATHS

(71) Applicant: TORC Robotics, Inc., Blacksburg, VA (US)

(72) Inventor: Ryan Chilton, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 133 days.

(21) Appl. No.: 18/221,830

(22) Filed: Jul. 13, 2023

(65) Prior Publication Data

US 2025/0018980 A1      Jan. 16, 2025

(51) Int. Cl.
| | |
|---|---|
| *B60W 60/00* | (2020.01) |
| *B60W 30/095* | (2012.01) |
| *B60W 40/06* | (2012.01) |
| *G06N 20/00* | (2019.01) |

(52) U.S. Cl.
CPC ...... B60W 60/0015 (2020.02); B60W 30/095 (2013.01); B60W 40/06 (2013.01); G06N 20/00 (2019.01); B60W 2420/403 (2013.01); B60W 2420/408 (2024.01)

(58) Field of Classification Search
CPC ........... B60W 60/0015; B60W 30/095; B60W 40/06; B60W 2420/403; B60W 2420/408; G06N 20/00; G06N 5/01; G06N 7/01
USPC .......................................................... 701/23
See application file for complete search history.

(56) References Cited

U.S. PATENT DOCUMENTS

| | | | | |
|---|---|---|---|---|
| 10,599,155 | B1 * | 3/2020 | Konrardy ............... | G06N 3/045 |
| 10,796,204 | B2 | 10/2020 | Rohani et al. | |
| 10,928,830 | B1 | 2/2021 | Tran | |
| 11,409,304 | B1 | 8/2022 | Cai et al. | |
| 11,458,993 | B2 | 10/2022 | Brown et al. | |
| 11,635,758 | B2 * | 4/2023 | Wray .................... | B60W 30/14 |
| | | | | 701/27 |
| 11,640,174 | B2 | 5/2023 | Tran | |
| 11,644,834 | B2 | 5/2023 | Ditty et al. | |

(Continued)

OTHER PUBLICATIONS

Cui, Henggang, et al. "Multimodal trajectory predictions for autonomous driving using deep convolutional networks." 2019 international conference on robotics and automation (icra). IEEE, 2019. (Year: 2019).

(Continued)

*Primary Examiner* — Tuan C To
*Assistant Examiner* — Dominick Mulder
(74) *Attorney, Agent, or Firm* — Armstrong Teasdale LLP

(57)                ABSTRACT

Systems and methods for learning safe driving paths in autonomous driving adversity conditions can include acquiring, by a computer system, vehicle sensor data for a plurality of driving events associated with one or more autonomous driving adversity conditions. The vehicle sensor data can include, for each driving event, corresponding image data depicting surroundings of the vehicle and corresponding inertial measurement data. The computer system can acquire, for each driving event of the plurality of driving events, corresponding vehicle positioning data indicative of a corresponding trajectory followed by the vehicle, and train, using the vehicle sensor data and the vehicle positioning data, a machine learning model to predict navigation trajectories during the autonomous driving adversity conditions.

20 Claims, 7 Drawing Sheets

(56) References Cited

U.S. PATENT DOCUMENTS

| | | | | |
|---|---|---|---|---|
| 11,782,451 | B1 * | 10/2023 | Venkatraman | G05D 1/0221 |
| | | | | 701/26 |
| 11,808,594 | B1 | 11/2023 | Love et al. | |
| 11,874,120 | B2 * | 1/2024 | Wray | B60W 60/0011 |
| 11,874,127 | B1 | 1/2024 | Love et al. | |
| 11,912,267 | B2 | 2/2024 | Seshadri et al. | |
| 11,970,164 | B1 * | 4/2024 | Havlak | B60W 30/0956 |
| 12,131,599 | B1 | 10/2024 | Shah | |
| 2014/0136414 | A1 * | 5/2014 | Abhyanker | G06Q 20/3224 |
| | | | | 701/25 |
| 2018/0342033 | A1 * | 11/2018 | Kislovskiy | G01C 21/3697 |
| 2019/0113918 | A1 * | 4/2019 | England | B60W 60/0015 |
| 2019/0129436 | A1 * | 5/2019 | Sun | G06N 3/08 |
| 2019/0329771 | A1 * | 10/2019 | Wray | B60W 30/18154 |
| 2019/0329782 | A1 * | 10/2019 | Shalev-Shwartz | B60W 30/09 |
| 2020/0342303 | A1 * | 10/2020 | Stent | G06N 3/08 |
| 2021/0009163 | A1 * | 1/2021 | Urtasun | G08G 1/0133 |
| 2021/0081893 | A1 | 3/2021 | Darmour et al. | |
| 2021/0096568 | A1 * | 4/2021 | Kumar | G05D 1/0212 |
| 2021/0181754 | A1 * | 6/2021 | Cui | G06N 3/045 |
| 2021/0197813 | A1 * | 7/2021 | Houston | B60W 30/143 |
| 2021/0216077 | A1 * | 7/2021 | Zhang | G01C 21/3407 |
| 2021/0342637 | A1 * | 11/2021 | Elluswamy | G16Y 20/10 |
| 2021/0403034 | A1 * | 12/2021 | Lapin | B60W 60/0027 |
| 2022/0227360 | A1 * | 7/2022 | Delhaye | H04W 4/44 |
| 2023/0067485 | A1 * | 3/2023 | Willoughby | B60W 60/00186 |
| 2023/0121388 | A1 * | 4/2023 | Khan | B60K 35/22 |
| | | | | 340/435 |
| 2023/0339395 | A1 * | 10/2023 | Haynes | B60Q 9/008 |
| 2023/0391367 | A1 * | 12/2023 | Belta | B60W 60/0015 |
| 2023/0415753 | A1 * | 12/2023 | Zhou | G05B 17/02 |
| 2023/0419080 | A1 | 12/2023 | Choi et al. | |
| 2024/0028673 | A1 * | 1/2024 | Xiao | B60W 60/0011 |
| 2024/0208546 | A1 | 6/2024 | Pronovost | |
| 2024/0351615 | A1 * | 10/2024 | Song | B60W 30/18163 |
| 2024/0400095 | A1 | 12/2024 | Lee et al. | |
| 2024/0420573 | A1 * | 12/2024 | Ucar | G05D 1/619 |
| 2024/0425211 | A1 | 12/2024 | Fransoy Pereira et al. | |
| 2025/0206354 | A1 * | 6/2025 | Weast | B60W 30/095 |

OTHER PUBLICATIONS

Muhammad, Khan, et al. "Deep learning for safe autonomous driving: Current challenges and future directions." IEEE Transactions on Intelligent Transportation Systems 22.7 (2020): 4316-4336. (Year: 2020).

* cited by examiner

100

Safe Driving Path Learning System 110

114

112a 112

112m 112

Communication Network 130

120a

120n

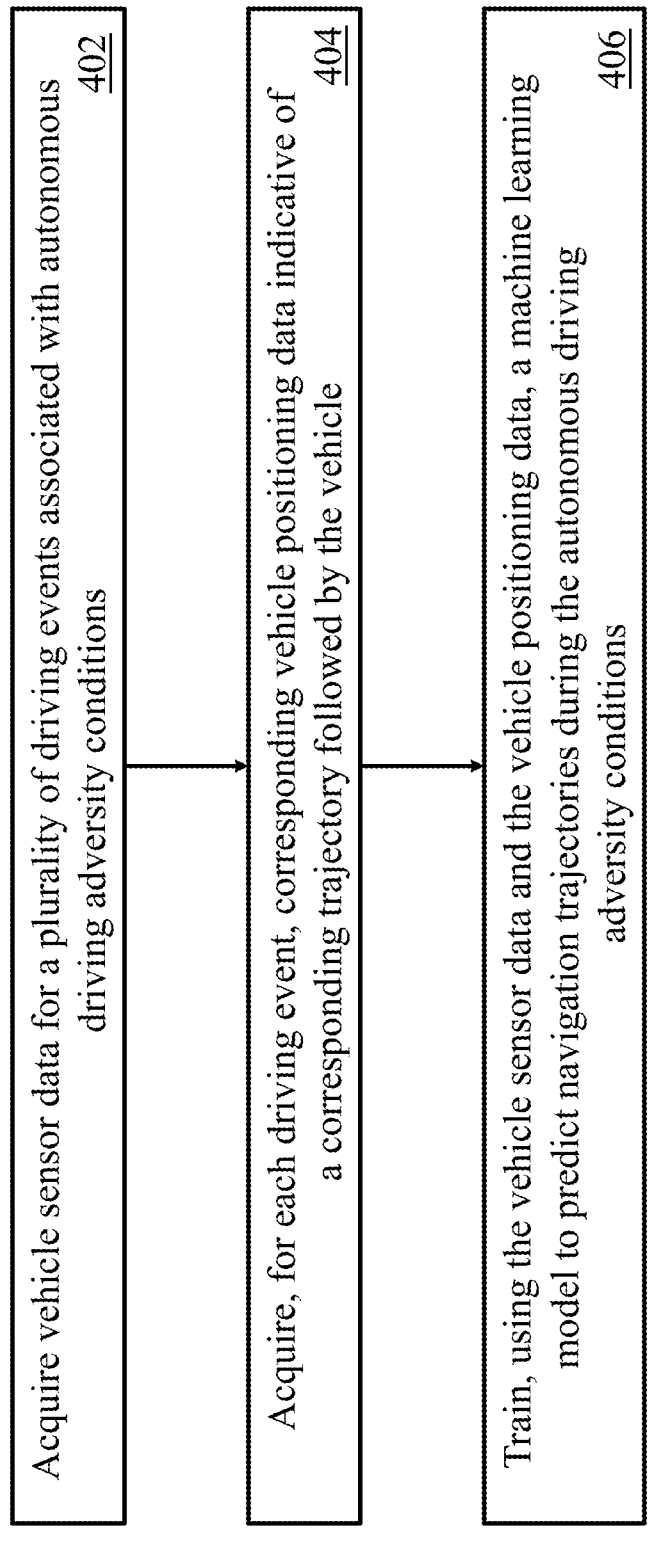

Acquire vehicle sensor data for a plurality of driving events associated with autonomous driving adversity conditions     402

Acquire, for each driving event, corresponding vehicle positioning data indicative of a corresponding trajectory followed by the vehicle     404

Train, using the vehicle sensor data and the vehicle positioning data, a machine learning model to predict navigation trajectories during the autonomous driving adversity conditions     406

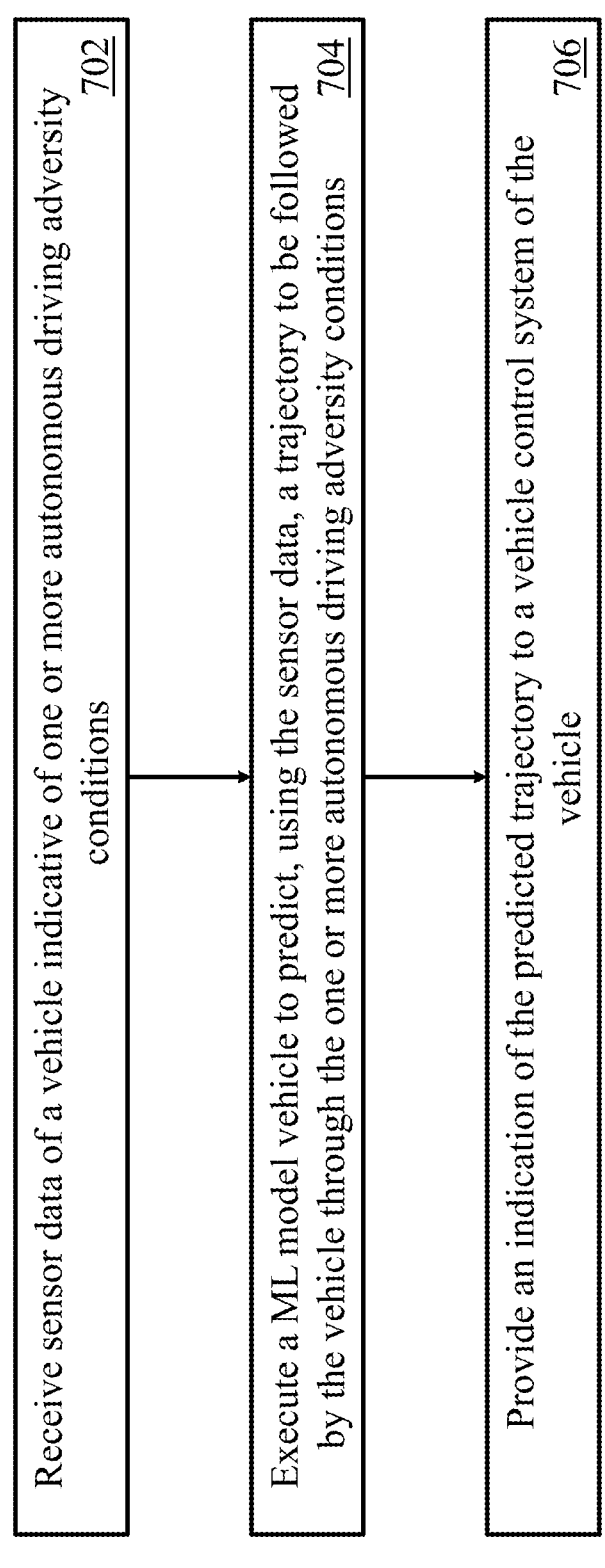

700

Receive sensor data of a vehicle indicative of one or more autonomous driving adversity conditions 702

Execute a ML model vehicle to predict, using the sensor data, a trajectory to be followed by the vehicle through the one or more autonomous driving adversity conditions 704

Provide an indication of the predicted trajectory to a vehicle control system of the vehicle 706

FIG. 7

METHODS AND SYSTEMS FOR LEARNING SAFE DRIVING PATHS

TECHNICAL FIELD

The present disclosure relates generally to training machine learning models to predict, determine or prescribe safe driving paths for autonomous vehicles. In particular, embodiments described herein relate to training machine learning models to predict, determine or prescribe safe driving paths or trajectories in autonomous driving adversity conditions.

BACKGROUND

Autonomous driving, also referred to as self-driving, refers to automatically operating vehicles to move and navigate without the intervention of a human driver. Self-driven vehicles include an autonomous driving system that is configured to automatically sense the environment of the vehicle, and automatically operate or navigate the vehicle in a safe and reliable manner based on the sensed environment. In other words, self-driven vehicles are equipped with various sensors to continuously collect or record data about the environment or surrounding of the vehicle as it navigates on roads. The self-driven vehicles are also equipped with positioning sensors to keep track of the position and orientation of the vehicle. The autonomous driving system uses the sensor data to make decisions about how to navigate the vehicle in various conditions or situations.

There are different levels of autonomous driving which include driver assistance, partial driving automation, conditional driving automation and full driving automation. To get to vehicles with full driving automation, the reliability and safety of the autonomous driving systems needs to be improved. In other words, autonomous driving systems should be able to navigate vehicles in different road and/or traffic condition with safety risks that are comparable to or lower than risks associated with human driving.

SUMMARY

The systems and methods of the present disclosure may solve the problem of automatic vehicle navigating in autonomous driving adversity conditions. Autonomous driving adversity conditions refer to road and/or traffic conditions or situations that are, or may be, tricky for autonomous driving systems. In particular, many autonomous driving systems are designed or engineered to make logic-based and/or cost-based decisions. However, such approach poses some technical challenges. First, there is a risk or possibility that some scenarios or conditions may not be accounted for or considered when by the autonomous driving system. Also, it may not be possible to assign a separate cost for each possible decision in each possible condition or scenario.

These technical challenges make autonomous driving systems prone to error in some relatively tricky situations or conditions. Embodiments described herein provide a learning approach to improve the reliability or safety of autonomous driving systems or to help autonomous driving systems navigate through such tricky conditions or situations. In particular, one or more machine learning (ML) models can be trained and deployed to predict, determine or prescribe navigation paths, navigation parameters and/or navigation instructions for navigating vehicles in autonomous driving adversity conditions. The ML model(s), or other ML model(s), can be trained and deployed to predict, determine or prescribe autonomous driving adversity conditions or tricky driving conditions.

According to at least one aspect, a method can include acquiring, by a computer system including one or more processors, vehicle sensor data for a plurality of driving events associated with autonomous driving adversity conditions. The vehicle sensor data can include, for each driving event, corresponding image data depicting surroundings of the vehicle and corresponding inertial measurement data. The method can include acquiring, by the computer system, for each driving event of the plurality of driving events, corresponding vehicle positioning data indicative of a corresponding trajectory followed by the vehicle, and training, by the computer system, using the vehicle sensor data and the vehicle positioning data, a machine learning model to predict, determine or prescribe navigation trajectories during the autonomous driving adversity conditions.

In some implementations, the method can include training, by the computer system, using the vehicle sensor data and the vehicle positioning data, the machine learning model to detect the autonomous driving adversity conditions. The plurality of driving events can include a first subset of the driving events associated with the autonomous driving adversity conditions and a second subset of driving events associated with autonomous driving non-adversity conditions.

In some implementations, the method can further include projecting, by the computer system, for each driving event of the plurality of driving events, a graphical representation of the corresponding trajectory followed by the vehicle on the corresponding image data depicting the surroundings of the vehicle, and using, by the computer system, trajectories followed by the vehicle projected on image data for the plurality of driving events to train the machine learning model.

In some implementations, the image data can include at least one of images captured by a camera of the vehicle or images captured by a light detection and ranging (LIDAR) system of the vehicle.

In some implementations, the autonomous driving adversity conditions include at least one of a road work zone or a construction zone, obscured or missing road markings or one or more obstacles on or alongside a road segment traveled by the vehicle.

In some implementations, the vehicle positioning data can include at least one of data indicative of interactions of an individual operating the vehicle with driving control devices of the vehicle or data captured by positioning sensors of the vehicle.

In some implementations, at least a subset of the plurality of driving events is associated with of an individual operating the vehicle disabling an autonomous driving mode of the vehicle.

In some implementations, the machine learning model can include at least one of a neural network, a random forest, a statistical classifier, a Naïve Bayes classifier or a hierarchical clusterer.

In some implementations, training the machine learning model to predict, determine or prescribe navigation trajectories includes training the machine learning model to provide control instructions to navigate the vehicle through a predicted, determined or prescribed trajectory.

According to at least one other aspect, a system can include at least one processor and a non-transitory computer readable medium storing computer instructions. The computer instructions, when executed by the at least one processor, cause the system to acquire vehicle sensor data for a plurality of driving events associated with autonomous driving adversity conditions. The vehicle sensor data can include, for each driving event, corresponding image data depicting surroundings of the vehicle and corresponding inertial measurement data. The computer instructions can cause the system to acquire, for each driving event of the plurality of driving events, corresponding vehicle positioning data indicative of a corresponding trajectory followed by the vehicle, and train, using the vehicle sensor data and the vehicle positioning data, a machine learning model to predict, determine or prescribe navigation trajectories during the autonomous driving adversity conditions.

In some implementations, the computer instructions can further cause the system to train, using the vehicle sensor data and the vehicle positioning data, the machine learning model to detect the autonomous driving adversity conditions. The plurality of driving events can include a first subset of the driving events associated with the autonomous driving adversity conditions and a second subset of driving events associated with autonomous driving non-adversity conditions.

In some implementations, the computer instructions can further cause the system to project, for each driving event of the plurality of driving events, a graphical representation of the corresponding trajectory followed by the vehicle on the corresponding image data depicting the surroundings of the vehicle and use graphical representations of trajectories followed by the vehicle projected on image data for the plurality of driving events to train the machine learning model.

In some implementations, the image data can include at least one of images captured by a camera of the vehicle or images captured by a light detection and ranging (LIDAR) system of the vehicle.

In some implementations, the autonomous driving adversity conditions can include at least one of a road work zone or a construction zone, obscured or missing road markings or one or more obstacles on or alongside a road segment traveled by the vehicle.

In some implementations, the vehicle positioning data can include at least one of data indicative of interactions of an individual operating the vehicle with driving control devices of the vehicle or data captured by positioning sensors of the vehicle.

In some implementations, at least a subset of the plurality of driving events is associated with of an individual operating the vehicle disabling an autonomous driving mode of the vehicle.

In some implementations, the machine learning model can include at least one of a neural network, a random forest, a statistical classifier, a Naïve Bayes classifier or a hierarchical clusterer.

In some implementations, in training the machine learning model to predict, determine or prescribe navigation trajectories, the computer instructions can cause the system to train the machine learning model to provide control instructions to navigate the vehicle through a predicted, determined or prescribed trajectory.

According to yet another aspect, a non-transitory computer-readable medium can comprise computer instructions. The computer instructions when executed by one or more processors cause the one or more processors to acquire vehicle sensor data for a plurality of driving events associated with autonomous driving adversity conditions. The vehicle sensor data can include, for each driving event, corresponding image data depicting surroundings of the vehicle and corresponding inertial measurement data. The computer instructions can cause the one or more processors to acquire, for each driving event of the plurality of driving events, corresponding vehicle positioning data indicative of a corresponding trajectory followed by the vehicle, and train, using the vehicle sensor data and the vehicle positioning data, a machine learning model to predict, determine or prescribe navigation trajectories during the autonomous driving adversity conditions.

According to yet another aspect, a method can include receiving, by a computer system including one or more processors, sensor data of a vehicle that is traveling. The sensor data can be indicative of one or more autonomous driving adversity conditions and can include image data depicting surroundings of the vehicle and inertial measurement data. The method can include executing, by the computer system, a trained machine learning model to predict, determine or prescribe, using the sensor data, a trajectory to be followed by the vehicle through the one or more autonomous driving adversity conditions, and providing, by the computer system, an indication of the predicted, determined or prescribed trajectory to an autonomous driving system of the vehicle.

In some implementations, the method can include executing, by the computer system, the trained machine learning model to detect the one or more autonomous driving adversity conditions using the vehicle sensor data, and executing, by the computer system, the trained machine learning model to predict, determine or prescribe the trajectory to be followed by the vehicle responsive to detecting the one or more autonomous driving adversity conditions.

In some implementations, the method can include receiving, by the computer system, an indication that a second trajectory determined by the autonomous driving system is associated with a potential collision, and executing, by the computer system, the trained machine learning model responsive to receiving the indication that the second trajectory is associated with the potential collision.

In some implementations, the image data can include at least one of one or more images captured by a camera of the vehicle or one or more images captured by a light detection and ranging (LIDAR) system of the vehicle.

In some implementations, predicting, determining or prescribing the trajectory includes generating, by the machine learning model, a graphical representation of the trajectory projected on the image data.

In some implementations, the autonomous driving adversity conditions can include at least one of a road work zone or a construction zone, obscured or missing road markings or one or more obstacles on or alongside a road segment traveled by the vehicle.

According to yet another aspect, a system can include at least one processor and a non-transitory computer readable medium storing computer instructions. The computer instructions, when executed by the at least one processor, cause the system to receive sensor data of a vehicle that is traveling. The sensor data can be indicative of one or more autonomous driving adversity conditions and can include image data depicting surroundings of the vehicle and inertial measurement data. The computer instructions can cause the system to execute a machine learning model to predict, determine or prescribe, using the sensor data, a trajectory to be followed by the vehicle through the one or more autonomous driving adversity conditions, and provide an indication of the predicted, determined or prescribed trajectory to an autonomous driving system of the vehicle.

In some implementations, the computer instructions cause the system to execute the trained machine learning model to detect the one or more autonomous driving adversity conditions using the vehicle sensor data and execute the trained machine learning model to predict, determine or prescribe the trajectory to be followed by the vehicle responsive to detecting the one or more autonomous driving adversity conditions.

In some implementations, the computer instructions can cause the system to receive an indication that a second trajectory determined by the autonomous driving system is associated with a potential collision and execute the trained machine learning model responsive to receiving the indication that the second trajectory is associated with the potential collision.

In some implementations, the image data can include at least one of one or more images captured by a camera of the vehicle or one or more images captured by a light detection and ranging (LIDAR) system of the vehicle.

In some implementations, predicting, determining or prescribing the trajectory includes generating, by the machine learning model, a graphical representation of the trajectory projected on the image data.

In some implementations, the autonomous driving adversity conditions can include at least one of a road work zone or a construction zone, obscured or missing road markings or one or more obstacles on or alongside a road segment traveled by the vehicle.

According to yet another aspect a non-transitory computer-readable medium can comprise computer instructions. The computer instructions when executed by one or more processors cause the one or more processors to receive sensor data of a vehicle that is traveling. The sensor data can be indicative of one or more autonomous driving adversity conditions and can include image data depicting surroundings of the vehicle and inertial measurement data. The computer instructions can cause the one or more processors to execute a machine learning model to predict, determine or prescribe, using the sensor data, a trajectory to be followed by the vehicle through the one or more autonomous driving adversity conditions, and provide an indication of the predicted, determined or prescribed trajectory to an autonomous driving system of the vehicle.

In some implementations, the computer instructions cause the one or more processors to execute the trained machine learning model to detect the one or more autonomous driving adversity conditions using the vehicle sensor data and execute the trained machine learning model to predict, determine or prescribe the trajectory to be followed by the vehicle responsive to detecting the one or more autonomous driving adversity conditions.

In some implementations, the computer instructions can cause the one or more processors to receive an indication that a second trajectory determined by the autonomous driving system is associated with a potential collision and execute the trained machine learning model responsive to receiving the indication that the second trajectory is associated with the potential collision.

In some implementations, the image data can include at least one of one or more images captured by a camera of the vehicle or one or more images captured by a light detection and ranging (LIDAR) system of the vehicle.

In some implementations, predicting, determining or prescribing the trajectory includes generating, by the machine learning model, a graphical representation of the trajectory projected on the image data.

In some implementations, the autonomous driving adversity conditions can include at least one of a road work zone or a construction zone, obscured or missing road markings or one or more obstacles on or alongside a road segment traveled by the vehicle.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts a flow chart illustrating a method for learning safe driving paths, according to an embodiment.

FIG. 7 depicts a flow chart illustrating a method for determining a safe driving path, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
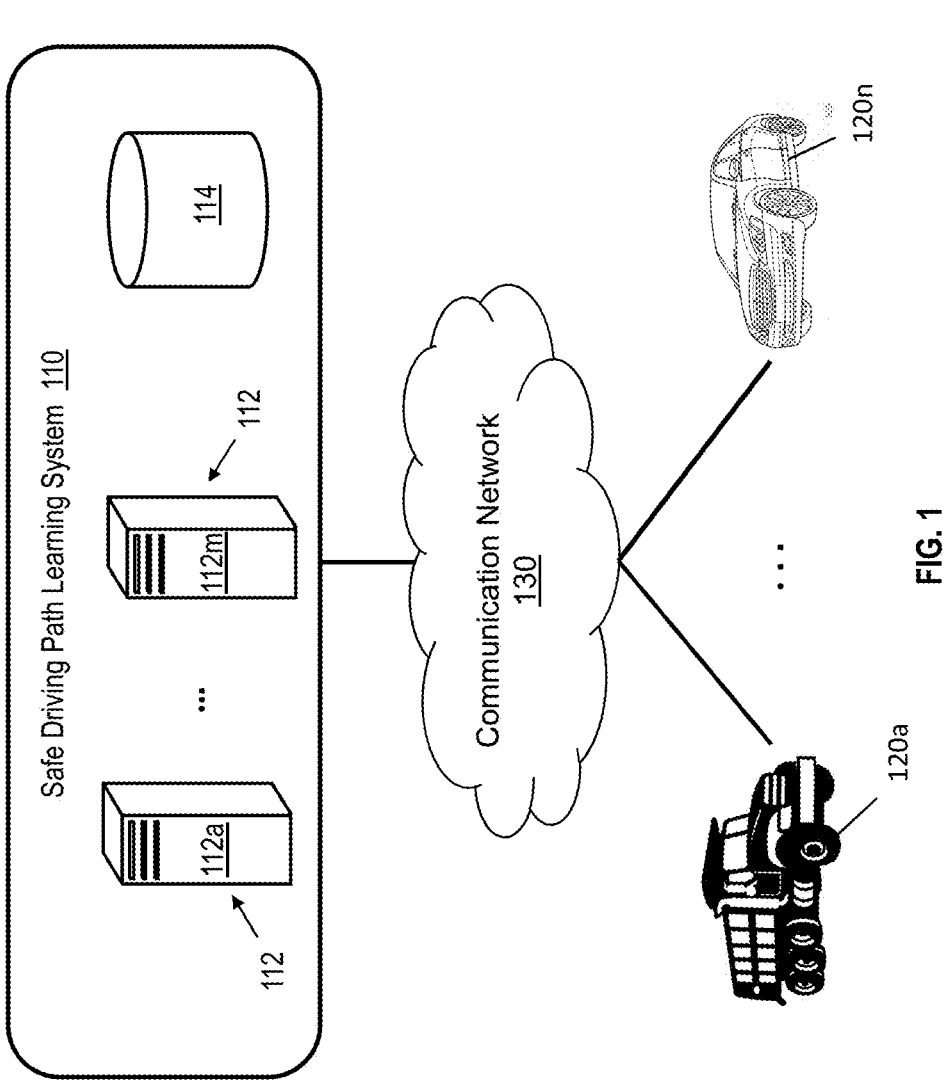
FIG. 1 depicts an example computer environment for implementing methods and processes described herein, according to an embodiment.

FIG. 1 depicts a non-limiting example of a computer environment 100 for implementing methods and processes described herein, according to an embodiment. In brief overview, the computer environment 100 can include a safe driving path learning (SDPL) system 110 and a plurality of road vehicles 120a-120n, referred to individually or collectively as vehicle(s) 120. The SDPL system 110 can include one or more computing devices, such as devices 112a-112m which are referred to herein either individually or collectively as computing device(s) 112, and a database 114. The vehicle(s) 120 can be communicatively couped to the SDPL system 110 via a communication network 130.

The SDPL system 110 is configured to generate and/or train machine learning models to predict, determine or prescribe safe driving paths or trajectories, especially in autonomous driving adversity conditions. The machine learning models generated or trained by the SDPL system 110 can help autonomous vehicles navigate in tricky situations where autonomous driving systems would most likely fail to produce a safe navigation path. The SDPL system 110 can be configured to generate and/or train machine learning models to detect autonomous driving adversity conditions based on a vehicle sensor data. The SDPL system 110 can receive or acquire sensor data from the vehicle(s) 120 and use the received sensor data to train and/or validate the machine learning models.

The computing device(s) 112 may include any computing device comprising a processor and non-transitory machine-readable storage (e.g., memory) capable of executing the various tasks and processes described herein. Non-limiting examples of the computing device(s) 112 may include workstation computers, desktop computers, laptop computers, server computers or a combination thereof, among others. The SDPL system 110 can be residing in a cloud environment and the computing device(s) 112 can include one or more cloud servers, e.g., operating in a distributed manner. The computing device(s) 112 can execute one or more virtual machines to perform the various tasks and processes described herein.

The database 114 may be any data repository (e.g., relational database) configured to store data. The database 114 can store training and/or validation data acquired from the vehicle(s) 120, trained machine learning models or a combination thereof. The database 114 may be in communication with the computing device(s) 112, such that the data records acquired and/or generated by the computing device(s) 112 are stored within the database 114.

The SDPL system 110 can provide the training and/or validation of machine learning models for prediction, determining or prescribing of safe navigation paths as a service. The SDPL system 110 can provide the trained and/or validated machine learning models to one or more vehicles 120 for deployment or execution in the vehicle(s) 120. In some implementations, the trained and/or validated machine learning models can be deployed in the SDPL system 110. Specifically, in the deployment phase, a vehicle 120 can acquire sensor data while on the road and transmit the acquired data in real time or near real time (e.g., immediately after the acquisition of the data) to the SDPL system 110. The SDPL system 110 can feed the received vehicle sensor data to a trained and/or validated machine learning model to detect whether the vehicle is going through an autonomous driving adversity condition and/or predict, determine or prescribe a safe navigation path.

Deployment of the trained and/or validated machine learning models in the vehicle(s) 120 has the advantage of eliminating or reducing communications between the SDPL system 110 and the vehicle(s) 120 in the deployment phase at the expense of more computational power being used at the vehicle(s) 120 to execute the machine learning model(s). In contrast, deployment of the trained and/or validated machine learning models in the SDPL system 110 has the advantage of reducing the computational power consumed by the vehicle(s) 120 in the deployment phase at the expense of more bandwidth usage for communicating sensor data and outputs of the machine learning models. Also, deployment of the trained and/or validated machine learning models in the vehicle(s) 120 has may lead to faster outputs from the machine learning models, depending on the computational resources on board of the vehicle(s) 120 and the communication resources available for communications between the SDPL system 110 and the vehicle(s) 120.

The vehicle(s) 120 may be an on-road vehicle including, but not limited to, line-haul trucks, mid-range trucks (e.g., pick-up truck), cars (e.g., sedans, hatchbacks, coupes, etc.), buses, vans, refuse vehicles, fire trucks, concrete trucks, delivery trucks, among others. The vehicle(s) 120 used to collect training data may be different than the vehicle(s) 120 deploying or using the trained machine learning models. In some implementations, vehicle(s) 120 deploying the trained and/or validated machine learning models may be configured to automatically acquire and provide training data to the SDPL system 110. As discussed in further detail below, the vehicle(s) 120 used to collect training data may include one or more applications or modules to automatically collect and provide training data to the SDPL system 110. In some implementations, the training data can be collected by one or more designated vehicles 120 that are driven through various autonomous driving adversity conditions or scenarios. The designated vehicle(s) 120 can transfer the collected training data via the communication network 130. In some implementations, the collected training data can be stored in one or more storage devices at the designated vehicle(s) 120 and transferred to the SDPL system 110 via the communication network 130 or through other means.

Examples of the communication network 130 may include, but are not limited to, private or public LAN, WLAN, MAN, WAN, the Internet or a combination thereof, among others. The network 130 may include both wired and wireless communications according to one or more standards and/or via one or more transport mediums. The communication over the network 130 may be performed in accordance with various communication protocols such as Transmission Control Protocol and Internet Protocol (TCP/IP), User Datagram Protocol (UDP) and/or IEEE communication protocols, among others. In one example, the network 130 may include wireless communications according to Bluetooth specification sets or another standard or proprietary wireless communication protocol. In another example, the network 130 may include communications over a cellular network, including, e.g., a GSM (Global System for Mobile Communications), CDMA (Code Division Multiple Access), EDGE (Enhanced Data for Global Evolution) network.

Figure 2:
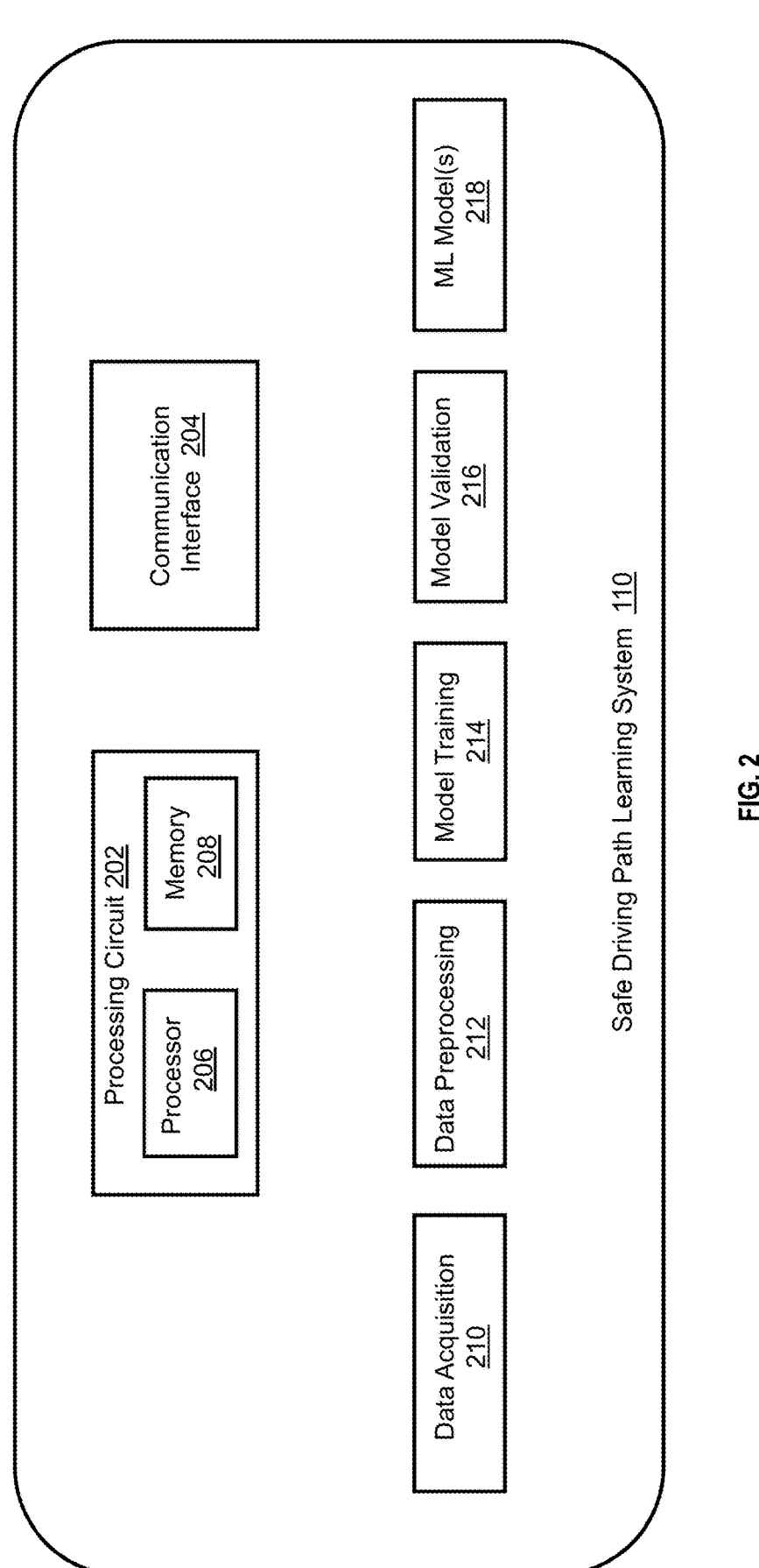
FIG. 2 depicts a block diagram of a system for learning safe driving paths, according to an embodiment.

Referring now to FIG. 2, a block diagram of the SDPL system 110 for learning safe driving paths or trajectories is shown, according to an embodiment. In brief overview, the SDPL system 110 can include a processing circuit 202 and a communication interface 204. The processing circuit 202 can include one or more processors 206 and a memory 208. While FIG. 2 shows a single processing circuit 202, the SDPL system 110 can include any number of processing circuits 202, e.g., associated with a number of computing devices 112. The SDPL system 110 can include a data acquisition component (or module) 210, a data preprocessing component (or module) 212, a model training component (or module) 214, a model validation component (or module) 216 and one or more machine learning (ML) models 218.

The processing circuit 202 or the processor 206 can be configured to execute or implement instructions, commands, and/or control processes described herein with respect to the data acquisition component 210, the preprocessing component 212, the model training component 214, the model validation component 216, the machine learning model(s) 218, and/or methods described below in relation with FIGS. 4 and 7. The processor 206 can include a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 206 may be a microprocessor. In some implementations, the SDPL system 110 may include one or more processors 204, which may be shared by the components 210-218 or any combination thereof. In some implementations, the one or more processors 206 may be configured to perform or otherwise execute certain operations independent of one or more co-processors. Two or more processors may be coupled via a bus to enable independent, parallel, pipelined, or multithreaded instruction execution. All such variations are intended to fall within the scope of the present disclosure.

The memory 208 (e.g., memory unit, storage device and/or non-transitory storage medium) may include one or more devices (e.g., RAM, ROM, Flash memory, hard disk storage) for storing data and/or computer code instructions for completing or facilitating the various processes, layers and modules described in the present disclosure. The memory 208 may be communicatively connected to the one or more processors 206 to provide computer code instructions to the processor(s) 206 for executing at least some of the processes described herein. Moreover, the memory 208 may be or include tangible, non-transient volatile memory or non-volatile memory. Accordingly, the memory 208 may include database components, object code components, script components, or any type of data structures for supporting or facilitating the various tasks described herein.

The communication interface 204 may include any combination of wired and/or wireless interfaces for conducting data communications with the vehicle(s) 120 and/or other devices. For example, the communications interface 204 may include an Ethernet card and port for sending and receiving data via an Ethernet-based communications network and/or a Wi-Fi transceiver for communicating via a wireless communication network. The communication interface 204 may be configured to communicate via local area networks or wide area networks (e.g., the Internet) and may use a variety of communications protocols, such as TCP/IP, UDP, IEEE communication protocols, Bluetooth, ZigBee, radio, cellular, near field communication or a combination thereof, among others.

The data acquisition component 210, the data preprocessing component 212, the model training component 214, the model validation component 216 and/or the machine learning model(s) 218 can be implemented as machine-executable instructions that are stored in the memory 208 (or other memory or storage medium) and executed by the processor(s) 206. In some implementations, the data acquisition component 210, the data preprocessing component 212, the model training component 214, the model validation component 216 and/or the machine learning model(s) 218 can be implemented as software, firmware, hardware or a combination thereof.

The data acquisition component 210 is configured to receive training data, validation data and/or sensor data for feeding as input to the machine ML model(s) 218 from the vehicle(s) 120. The data preprocessing component 212 can be configured to preprocess data received from the vehicle(s) 120 for use to train and/or validate ML models for predicting, determining or prescribing safe driving paths and/or detecting autonomous driving adversity conditions. The data preprocessing component 212 can be configured to preprocess data received from the vehicle(s) 120 during the deployment phase for feeding as input to trained and/or validated ML model(s) 218. In some implementations, the data preprocessing component 212 can be integrated in the model training component 214, the model validation component 216 and/or the ML model(s) 218. The model training component 214 can be configured to use the training data received from the vehicle(s) 120 to train the ML model(s) 218. The training data can include a plurality of datasets corresponding to a plurality of driving events or scenarios. In some implementations, the model training component 214 can use preprocessed training data for model training. Training a machine learning model includes determining or estimating parameters of the model, e.g., iteratively. The model validation component 216 can be configured to validate trained ML models using validation data received from the vehicle(s) 120. The data acquisition component 210 or data preprocessing component 212 can designate a subset of the training datasets received from the vehicle(s) 120 as training data and designate another subset of the datasets as validation data. During the validation phase, the model validation component 216 can further update or tune the parameters of the trained model(s), e.g., to further improve the performance of the ML model(s). Each ML model 218 represents trained and validated model which is ready for deployment. The ML model(s) 218 can be deployed in the SDPL system 110 or in one or more vehicles 120. The components 210-218 and their functionalities are described in further detail below in relation with FIGS. 4-7.

Figure 3:
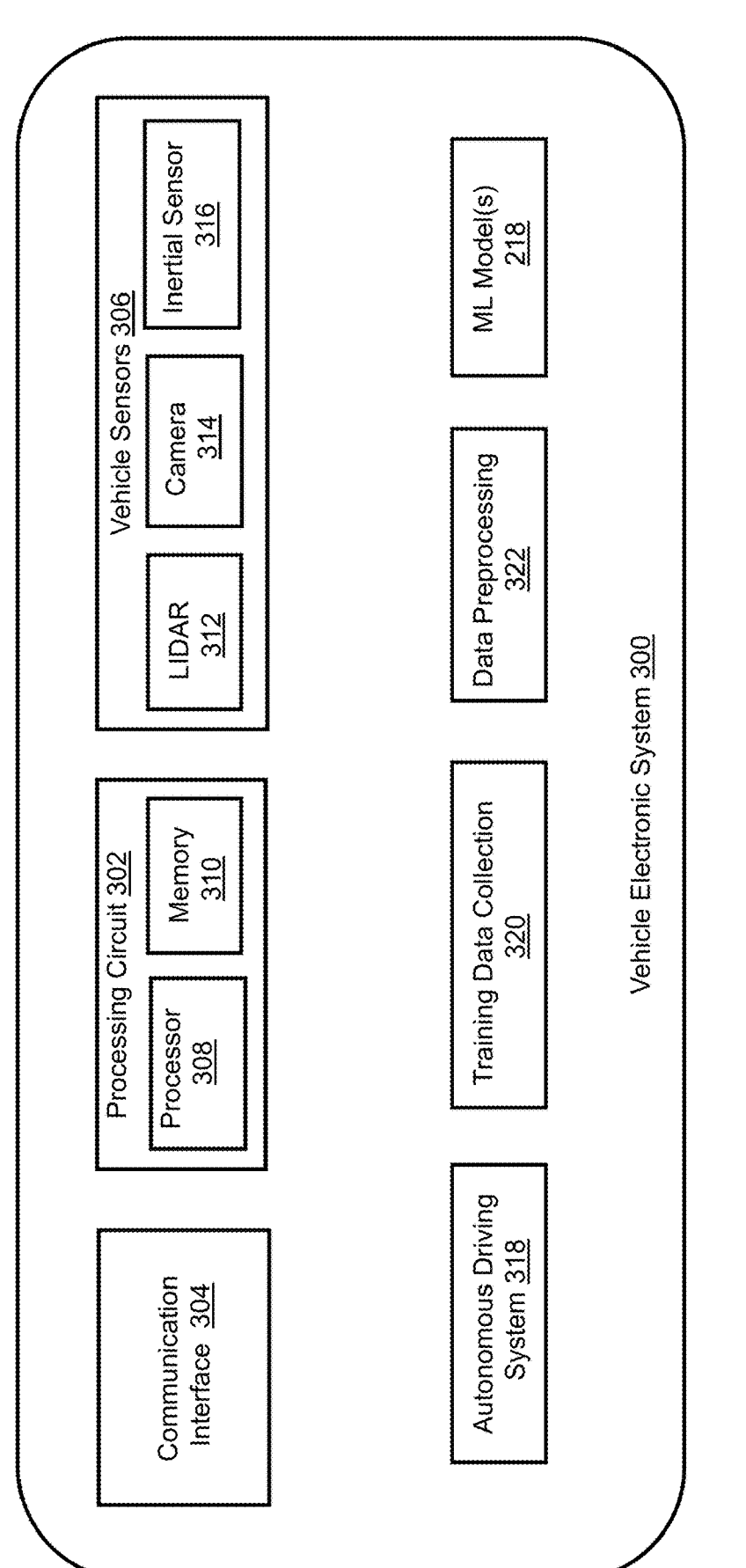
FIG. 3 depicts a block diagram of a vehicle electronic system, according to an embodiment.

FIG. 3 depicts a block diagram of a vehicle electronic system 300, according to an embodiment. In brief overview, the vehicle electronic system 300 can include a processing circuit 302, a communication interface 304 and a plurality of vehicle sensors 306. The processing circuit 302 can include one or more processors 308 and a memory 310. The vehicle sensors 306 can include a light detection and ranging (LIDAR) system 312, one or more camera devices 314 and an inertial sensor 316. While FIG. 2 shows a single processing circuit 302, the vehicle electronic system 300 of the vehicle(s) 120 can include any number of processing circuits 302. The vehicle electronic system 300 can include an autonomous driving system 318, a training data collection component (or module) 320, a data preprocessing component (or module) 322, and one or more ML models 218.

The processor(s) 308 can include any of the processor types described in relation with processor(s) 206, and can be configured to execute tasks, processes or processing steps performed in the corresponding vehicle 120 by the vehicle electronic system 300 or any of the components or modules 218 or 318-322. The memory 310 can include any of the types of storage devices or storage media described above in relation with memory 208 and can store executable instructions and/or data for performing tasks or processes performed by the vehicle electronic system 300 or any of the components or modules 218 or 318-322. The communication interface 304 can be similar to, or can be implemented as described above in relation with, the communication interface 204. The communication interface 304 can be configured to facilitate communications between the corresponding vehicle 120 and other remote devices or systems, such as the SDPL system 110.

The vehicle sensors 306 can include a LIDAR system 312 and/or one or more camera devices 314 to capture or record images depicting the surrounding of the vehicle 120. The LIDAR system 312 can capture images and/or point clouds depicting the surrounding of the vehicle 120. The captured images and/or point clouds can be used by the autonomous driving system 318 to detect obstacles and/or objects close to or along the path of the vehicle 102. The captured images and/or point clouds can be used by the autonomous driving system 318 to detect, determine or recognize road boundaries, lane lines, pedestrian crossings, road signs and/or traffic lights, among other characteristics or visual information of the vehicle surrounding. As discussed in further detail below, the images and/or point clouds captured by the LIDAR system 312 and/or the camera device(s) 314 can be used for model training or validating or as input to ML model(s) 218 to predict, determine or prescribe safe driving paths and/or detect autonomous driving adversity conditions. The vehicle electronic system 300 can include other sensors, such as a radar, a magnetometer or an active infrared sensor, to detect other objects or obstacles as well as the distances, angles and/or radial velocities associated with the detected objects or obstacles.

The inertial sensor 316, also referred to as inertial measurement unit (IMU), measures the linear acceleration and angular velocity of the vehicle 120. In particular, the inertial sensor 316 can include an accelerometer to measure the linear acceleration and a gyroscope to measure the angular velocity. Given a known starting location of the vehicle 120, the inertial sensor 316 can provide information on current vehicle location and orientation using measured accelerations and angular velocities over time. The inertial sensor 316 can be viewed as a positioning sensor of the vehicle 120. The vehicle 120 or the vehicle electronic system 300 can include other sensors, such as a speed sensor and/or a global positioning system (GPS) device, among others.

The autonomous driving system 318, also referred to herein as self-driving system 318, is configured to automatically operate the vehicle 120 without human involvement. In particular, the autonomous driving system 318 can automatically sense the environment of the vehicle 120 using data received from the vehicle sensors 306 and generate instructions that are sent to actuators or control device of the vehicle 120 to operate the vehicle 120. A human passenger can disable or put on hold the autonomous driving system 318 to switch from the autonomous driving mode to a manual or human driving mode.

The training data collection component (or module) 320 can be configured to manage acquisition of training data from the vehicle sensors 306 and manage the transmission of the training data to the SDPL system 110. The training data collection component 320 can also manage acquisition of sensor data used using during the deployment phase by the MK model(s) 218 to predict, determine or prescribe safe driving trajectories or to detect autonomous driving adversity conditions. The data preprocessing component 322 can be configured to preprocess sensor data generated by the vehicle sensors 306 before feeding as input to the ML model(s) 218 or before transmission of the sensor data to the SDPL system 110. In some implementations, the data preprocessing component 322 may be integrated in the training data collection component 320 or the ML model(s) 218. The ML model(s) 218 represent trained and validated models received from the SDPL system 110 and deployed in the vehicle 120 for predicting, determining or prescribing safe driving trajectories and/or detecting autonomous driving adversity conditions. The ML model(s) 218 can be integrated in the autonomous driving system 318 or can be a separate component configured to assist the autonomous driving system 318 in navigating the vehicle 120, especially in autonomous driving adversity conditions. The components 318-322 and their functionalities are described in further detail below in relation with FIGS. 4-7.

FIG. 4 depicts a flow chart illustrating a method 400 for learning safe driving paths, according to an embodiment. In brief overview, the method 400 can include acquiring vehicle sensor data for a plurality of driving events associated with autonomous driving adversity conditions (STEP 402) and acquiring, for each driving event, corresponding vehicle positioning data indicative of a corresponding a corresponding trajectory followed by the vehicle 120 (STEP 404). The method 400 can include training, using the sensor data and the vehicle positioning data, a machine learning model to predict, determine or prescribe navigation trajectories during the autonomous driving adversity conditions (STEP 406). The method 400 shown in FIG. 4 comprises steps 402-406. However, it should be appreciated that other embodiments may comprise additional or alternative steps or may omit one or more steps altogether as described below. It should also be appreciated that other embodiments may perform certain steps in a different order. Some of steps discussed herein may also be performed simultaneously or near-simultaneously. The method 400 or steps thereof can be executed or performed by the SDPL system 110, the computing device(s) 112, the processing circuit 202, the processor(s) 206 and/or other components (e.g., components 210-216) of the SDPL system 110.

The method 400 can include the SDPL system 110 or the data acquisition component 210 acquiring vehicle sensor data for a plurality of driving events associated with autonomous driving adversity conditions (STEP 402). The vehicle sensor data can include, for each driving event, corresponding image data depicting surroundings of the vehicle 120 and corresponding inertial measurement data. As used herein, a driving event can be or can include a trip segment of the vehicle 120 associated with a road or traffic condition. For instance, the sensor data can include a plurality of data sets for a plurality of trip segments of one or more vehicles 120. At least a subset of the datasets or trip segments can be associated with autonomous driving adversity conditions. As used herein, autonomous driving adversity conditions represent road or traffic conditions that may be tricky for the autonomous driving system 318 with respect to determining a safe driving path r trajectory. Autonomous driving adversity conditions can include a road work zone or a construction zone along the road segment, obscured or missing road markings such as lane lines or pedestrian crossings among others, one or more obstacles or objects on or alongside the road segment traveled by the vehicle 120 or a combination thereof. The data acquisition component 210 can acquire the vehicle sensor from one or more vehicles 120, e.g., via the communication network 130, for use to train and/or validate ML models for predicting, determining or prescribing safe driving paths and/or predicting autonomous driving adversity conditions.

The sensor data can be generated in one or more vehicles 120 for use as training data and/or validation data. The sensor data can be generated by autonomous vehicles or non-autonomous vehicles having data recording means. For example, a trained driver can drive a non-autonomous vehicle through various conditions or situations and cause recording of sensor data for various trip segments. The driver can manually control when to trigger or stop recording of the sensor data. Once recording is triggered, the training data collection component 320 can receive image data and/or point clouds from the LIDAR system 312 and/or the camera device(s) 314. The training data collection component 320 can trigger or instruct the LIDAR system 312 and/or the camera device(s) 314 to capture one or more images and/or point clouds of the surroundings of the vehicle 120. In some implementations, the LIDAR system 312 and/or the camera device(s) 314 can capture a sequence of images, e.g., a video sequence, and/or point clouds of the surroundings throughout the trip segment during which sensor data recording is activated.

In some implementations, the collected sensor data can include a first plurality of sensor data sets associated with autonomous driving adversity conditions and a second plurality of sensor data sets associated with autonomous driving non-adversity conditions. In other words, the plurality of driving events can include a first subset of the driving events associated with the autonomous driving adversity conditions and a second subset of driving events associated with autonomous driving non-adversity conditions. As used herein, autonomous driving non-adversity conditions refer to road and/or traffic conditions that are handled well by the autonomous driving system 318, e.g., with respect to determining a safe driving path or trajectory and safely navigating the vehicle 120 through such conditions. While sensor data sets for autonomous driving adversity conditions can be used to train ML models to predict, determine or prescribe safe driving paths or trajectories to be followed through such conditions, having sensor data sets for both autonomous driving adversity conditions and autonomous driving non-adversity conditions allows for training the ML models to detect the autonomous driving adversity conditions or to distinguish the autonomous driving adversity conditions from the autonomous driving non-adversity conditions.

In autonomous vehicles, the sensor data can be generated by manually or automatically. For example, a passenger or operator of the vehicle 120 can control for which trip segments sensor data is to be recorded as discussed above in relation with non-autonomous vehicles. The passenger or the operator of the vehicle 120 can disable the autonomous driving mode (or disable the autonomous driving system 316 from controlling the vehicle 120) during autonomous driving adversity conditions to operate the vehicle 120 manually. In some implementations, the training data collection component 320 can automatically detect the disabling of the autonomous driving mode, and in response, initiate or trigger acquisition and/or recording of the sensor data. The training data collection component 320 can automatically stop the acquisition and/or recording of the sensor data upon detecting reactivation of the autonomous driving mode. Once recording is triggered, the training data collection component 320 can receive image data from the LIDAR system 312 and/or the camera device(s) 314. The training data collection component 320 can trigger or instruct the LIDAR system 312 and/or the camera device(s) 314 to capture one or more images and/or point clouds of the surroundings of the vehicle 120. In some implementations, the LIDAR system 312 and/or the camera device(s) 314 can capture a sequence of images, e.g., a video sequence, and/or point clouds of the surroundings throughout the trip segment during which sensor data recording is activated.

Besides the image data or images received from the LIDAR system 312 and/or the camera device(s) 314, the training data collection component 320 can receive inertial measurement data from the inertial sensor 316 for each driving event. In particular, the inertial sensor 316 can measure or record inertial parameters, e.g., linear acceleration and angular velocity, on a regular basis sensor data recording is activated. For example, the inertial sensor 316 can record the inertial parameters of the vehicle 120 every second, every fraction of a second or every few seconds, and determine a corresponding position of the vehicle 120 at each time instant the inertial parameters are recorded or measured. The inertial sensor 316 can provide indications of the determined vehicle positions to the training data collection component 320. In some implementations, the acquisition of the inertial measurement data can be part of step 404 of the method 400.

The method 400 can include the SDPL system 110 or the data acquisition component 210 acquiring, for each driving event of the plurality of driving events, corresponding vehicle positioning data indicative of a corresponding trajectory followed by the vehicle 120 (STEP 404). For instance, the corresponding vehicle positioning data can be indicative of the corresponding trajectory followed by the vehicle 120 throughout an autonomous driving adversity condition or a trip segment associated with the autonomous driving adversity condition. The data acquisition component 210 can receive the vehicle positioning data associated with various driving events from one or more vehicles 120.

At the vehicle(s) 120, the training data collection component 320 can receive data indicative of the vehicle positions at regular time instances of recorded driving events as discussed above in relation with the inertial measurement data. In some implementations, the training data collection component 320 can receive or generate positioning data of the vehicle using other sensor data, e.g., in addition to inertial measurement data. For example, the training data collection component 320 can receive positioning data of the vehicle 120 from other positioning sensors or systems, such as a GPS device of the vehicle 120 and/or a wireless communication system employing triangulation triangulation techniques to determine positions of the vehicle 120 over time. In some implementations, the training data collection component 320 can receive data indicative of interactions of an individual operating the vehicle 120 with driving control devices or actuators, e.g., steering wheel, gas paddle and/or brake paddle, of the vehicle 120 from one or more sensors associated with the vehicle control devices or actuators. The training data collection component 320 can use the data indicative of interactions with the vehicle control devices or actuators, e.g., with other sensor data, to determine positions of the vehicle 120 at various time instances.

In some implementations, the training data collection component 320 and/or the data preprocessing component 322 can merge vehicle positioning data points received from various positioning sensors or systems and/or vehicle positioning data points determined based on data indicative of interactions with the vehicle control devices or actuators to determine more accurate positioning data of the vehicle 120. For example, the training data collection component 320 can use the inertial measurement data received from the inertial sensor 316 to interpolate positioning data of the vehicle 120 between positioning data points received from the GPS device and/or the wireless communication system.

The training data collection component 320 and/or the data preprocessing component 322 can use positioning data points received from the inertial sensor 316 and/or other positioning sensors or systems to generate a graphical representation of the path or trajectory followed by the vehicle during the recorded driving event or trip segment. In some implementations, the training data collection component 320 and/or the data preprocessing component 322 can project, for each driving event of the plurality of driving events, the graphical representation of the corresponding trajectory followed by the vehicle 120 on the corresponding image data or image(s) depicting the surroundings of the vehicle 120. In some implementations, the training data collection component 320 and/or the data preprocessing component 322 can directly generate the graphical representation of the trajectory followed by the vehicle 120 on the image(s) depicting the surroundings of the vehicle 120. In some implementations, the training data collection component 320 and/or the data preprocessing component 322 can represent or determine, for each driving event of the plurality of driving events, the corresponding trajectory as vehicle coordinates. For instance, the trajectory can be expressed or defined as a sequence of vehicle coordinates.

Figure 5:
FIG. 5 is an image depicting an example autonomous driving adversity condition and a corresponding driving trajectory followed by the vehicle, according to an embodiment.

Referring now to FIG. 5, an image 500 depicting an example autonomous driving adversity condition and a corresponding driving trajectory followed by the vehicle 120 is shown, according to an embodiment. In this case, the autonomous driving adversity condition includes a road segment without lane lines traced thereon. Lane lines represent a typical feature used by the autonomous driving system 318 to maintain the vehicle 120 in lane or to switch between lanes. When the lane lines are missing or obscured (e.g., by snow, dust, rain or water), the autonomous driving system 318 may fail to keep the vehicle 120 in lane or may cause the vehicle 120 to drive in an opposite lane of a two-way road. In FIG. 5, the markings 502 depict or illustrate the path or trajectory followed by the vehicle 120 through the road segment. In particular, the markings 502 depict or illustrate the path or trajectory followed by a human operator to navigate the vehicle 120 through the road segment. The markings 502 can be indicative of a recorded trajectory of the vehicle when it was driven by a human operator. For instance, the training data can be recorded or obtained from one or more vehicles (not necessarily an autonomous vehicle) while operated by human operators or drivers.

Figure 6:
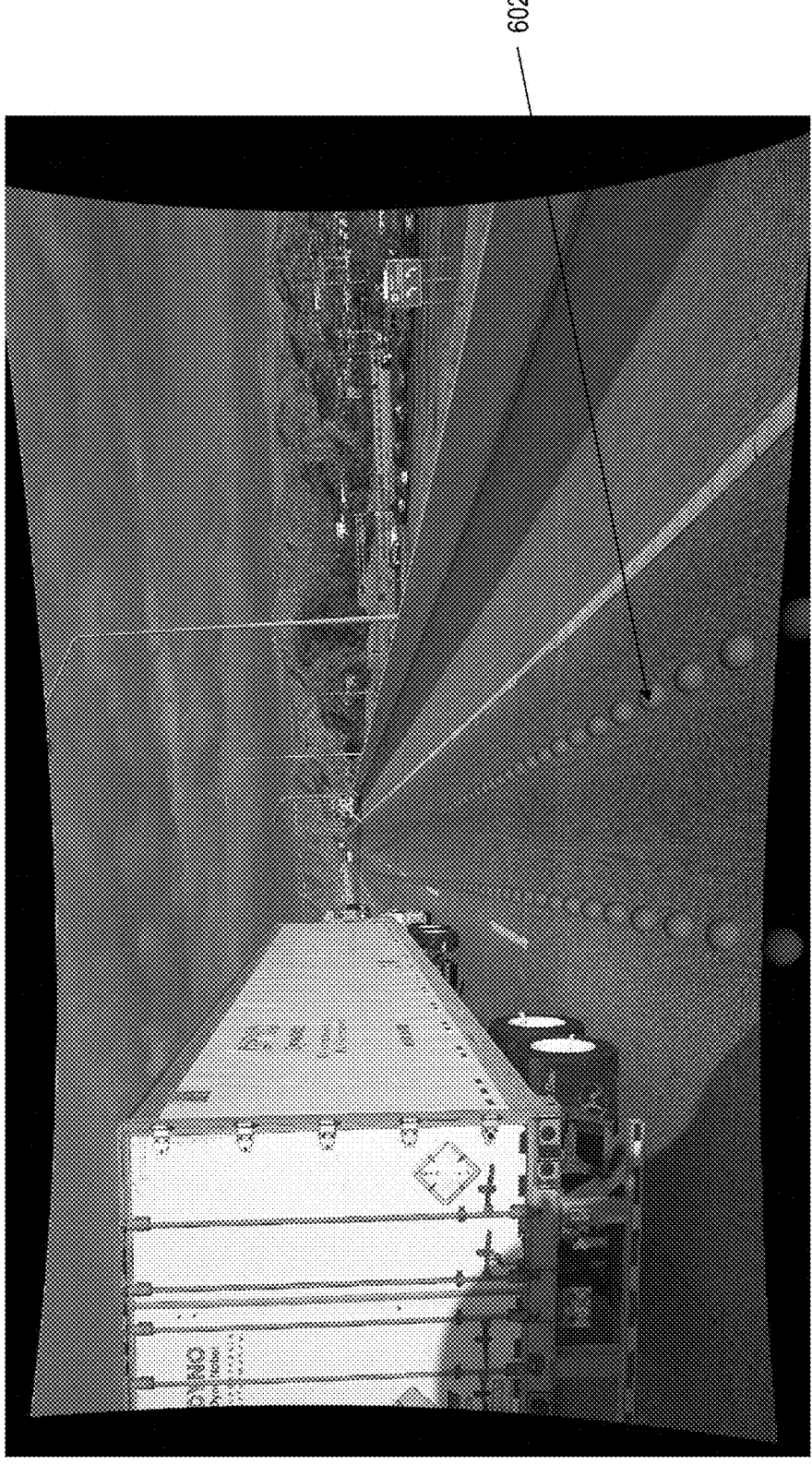
FIG. 6 is an image depicting another example autonomous driving adversity condition and a corresponding driving trajectory followed by the vehicle, according to an embodiment.

FIG. 6 shows an image 600 depicting another example autonomous driving adversity condition and a corresponding driving trajectory followed by the vehicle 120, according to an embodiment. In this case, the autonomous driving adversity condition includes another vehicle 602 along the side or lane occupied by the vehicle 120. The vehicle 602 can be for example, a police vehicle, a vehicle that went through an accident, a vehicle stopping due to some failure, a vehicle doing some road work or a combination thereof, among others. Also, another vehicle 604 happens to be driving in the lane adjacent to the one occupied by the vehicle 120 and in a relatively close proximity to the vehicle 120. In such situation or condition, the autonomous driving system 318 may fail to navigate the vehicle 120 safely, e.g., without colliding with the vehicle 602 or the vehicle 604. In FIG. 5, the markings 606 depict or illustrate the path or trajectory followed by the vehicle 120 through the road segment. In particular, the markings 606 depict or illustrate the path or trajectory followed by a human operator to navigate the vehicle 120 through the road segment. The markings 606 can be indicative of a recorded trajectory of the vehicle when it was driven by a human operator. For instance, the training data can be recorded or obtained from one or more vehicles (not necessarily an autonomous vehicle) while operated by human operators or drivers.

The data preprocessing component 322 can encode or compress the image data, e.g., before transmission to the SDPL system 110. In some implementations, the preprocessing data component 322 can label at least some of the image data sets generated at the vehicle 120. For instance, image data collected responsive to deactivation of the autonomous driving mode can labeled as "autonomous driving adversity condition" or some other label indicative of an autonomous driving adversity condition. In some implementations, the data preprocessing component 322 can label the image data (or sensor data) by augmenting the image data with metadata. In some implementations, the data preprocessing component 322 can augment the image data with metadata indicative of other sensor data, such as data indicative of actions taken by the human operator to navigate the vehicle, e.g., interactions with the vehicle control devices or actuators and timing or time stamps of such interactions. The data preprocessing component 322 can augment the image data with metadata indicative of geographical location information, data and time information or a combination thereof, among others.

At the SDPL system 110, the data preprocessing component 212 can be configured to decode or decompress sensor data (or image data) received from the vehicle(s) 120. The data preprocessing component 212 can extract any metadata received with the image data. In some implementations, the data preprocessing component 212 can designate a subset of the data sets received (e.g., corresponding to a subset of the recorded driving events) as training data and designate another subset as validation data. In some implementations, the data preprocessing component 212 can designate a first subset of the received data sets as training data to train ML model(s) to predict, determine or prescribe safe navigation paths or trajectories, designate a subset of the received data sets as validation data to validate ML model(s) trained to predict, determine or prescribe safe navigation paths or trajectories, designate a third subset of the received data sets as training data to train ML model(s) to detect autonomous driving adversity conditions, and designate a fourth subset of the received data sets as validation data to validate ML model(s) trained to detect autonomous driving adversity conditions. Training and validation data associated with detection of autonomous driving adversity conditions include image data sets (or sensor data sets) associated with autonomous driving adversity conditions and other image data sets (or sensor data sets) associated with autonomous driving non-adversity conditions.

The method 400 can the SDPL system 110 or the model training component 214 training, using the vehicle sensor data and the vehicle positioning data, a machine learning model to predict, determine or prescribe navigation trajectories during the autonomous driving adversity conditions (STEP 406). The model training component 214 can extract, from each sensor data set of a corresponding driving event, a plurality of image features. For example, the model training component 214 or the data preprocessing component 212 can segment the image data for each driving event. The model training component 214 can extract and/or determine various objects depicted in the image data, such as the road segment traveled by the vehicle 120, other vehicles or objects on or in the proximity of the road segment, road signs above or on the side of the road segment or a combination thereof, among others. The model training component 214 can extract and/or determine other visual features such as markings, if any, on the road segment. The model training component 214 can determine or compute relative positions, e.g., with respect to the position of the vehicle 120 and/or the road segment, of any detected objects. Given an image sequence for a recorded driving event, the model training component 214 may determine the image features for each image in the image sequence.

The model training component 214 can feed the features extracted from each image of a recorded driving event to an ML model for predicting, determining or prescribing safe navigation paths, and in response, the ML model is configured to determine a next position of the vehicle 120 or vehicle navigation parameters (or changes thereof) indicative of the next position of the vehicle 120. For example, the vehicle navigation parameters can include a linear speed, a linear acceleration (or deceleration), an angular velocity and/or a change in the angular velocity of the vehicle 120. The model training component 214 can compare the next position of the vehicle 120 determined (or deduced from navigation parameters provided by) by the ML model with a corresponding position from the positioning data of the vehicle. For example, the model training component 214 can compare a next position and/or next orientation of the vehicle 120 with positioning data indicative of the trajectory followed by the vehicle 120 during the driving event, such as the trajectories depicted by the markings 502 and 606 in FIGS. 5 and 6.

The model training component 214 can update parameters of the ML model based on the comparison. For example, the model training component 214 can update the parameters of the ML model based on the difference(s) between the next position and/or orientation of the vehicle 120 determined by the ML model and corresponding position and/or orientation determined from the received positioning data or the trajectory depicted in the image data. The training component 214 may update the parameters of the ML model based on the difference(s) between the navigation parameters of the vehicle 120 determined by the ML model and corresponding navigation parameters deduced from the training data (e.g., the trajectory depicted in the image data and timing information). In some implementations, the ML model can be configured to predict, determine or prescribe and output a navigation path of the vehicle 120 responsive to each of features input to the ML model. In other words, instead of determining a next position or next navigation parameters of the vehicle 120, model training component 214 can predict or determine next positions of the vehicle or next navigation parameters of the vehicle 120 for a predefined future time duration (e.g., next few second or minutes). In this case, the model training component 214 can compare the generated output of the ML model to a corresponding portion of the trajectory received as part of the training data set or to parameters deduced from the trajectory in the training data set.

The model training component 214 can iteratively update the parameters of the ML model using the plurality of training data sets. For example, the model training component 214 can update the parameters of the ML model once for each training data sets for a corresponding driving event or can update the parameters of the ML model for each data point (e.g., each image) of each training data set. The model training component 214 can keep updating the parameters of the ML model until the output of the ML model converges to the desired trajectories (or desired navigation parameters deduced from the desired trajectories) depicted in the training data sets (e.g., trajectories depicted via markings 502 and 606 in FIGS. 5 and 6, respectively).

In some implementations, the ML model can include a neural network such as a deep learning neural network, a random forest, a statistical classifier, a Naïve Bayes classifier a hierarchical clusterer, or a combination thereof. For example, the ML model for predicting, determining or prescribing safe navigation paths can include a deep learning neural network. In some implementations, the ML model can include a random forest. In some implementations, the ML model can include a combination of ML models, e.g., cascaded to each other.

In some implementations, the ML model can be configured or designed to output control instructions to navigate the vehicle 120 through a predicted, determined or prescribed trajectory. For example, the ML model can include an output layer or an output stage where a predicted, determined or prescribed navigation path or predicted, determined or prescribed navigation parameters are translated into control instructions to navigate the vehicle according to the predicted, determined or prescribed trajectory or predicted, determined or prescribed navigation parameters. The control instructions can include instructions for the steering wheel, instructions for the gas pedal, instructions for the brake pedal and/or instructions for other actuators of the vehicle 120. In some implementations, the training data sets can include indications of interactions of the human operator with actuators of the vehicle 120, and the model training component 214 can be configured to compare the instructions output by the ML model to the training information indicative of the human interactions with the actuators of the vehicle 120 and update the parameters of the ML model accordingly.

The model training component 214 can train or generate separate ML model(s) for detecting autonomous driving adversity conditions (or tricky, complex or challenging road or traffic conditions). The ML model(s) for detection of the tricky conditions or situations can be configured or designed to receive features extracted from the training sensor data (or training image data) and output an indication of whether the vehicle environment is indicative of a tricky condition or situation. The model training component 214 can update the parameters of the ML detection model based on a comparison of the output of the ML model and corresponding labeling of the training data. In some implementations, the model training component 214 can train or generate one or more ML models to detect risky conditions or situations and predict, determine or prescribe safe navigation paths or trajectories. For example, the model training component 214 can train or generate a concatenation of two or ML models to perform both functions.

The model validation component 216 can validate generated ML model(s) using corresponding validation data sets. During model validation, the model validation component 216 can further tune parameters of the validated ML model(s), e.g., ML model for predicting, determining or prescribing safe navigation paths and/or ML model for detecting autonomous driving adversity conditions.

FIG. 7 depicts a flow chart illustrating a method 700 for determining a safe driving path, according to an embodiment. In brief overview, the method 700 can include receiving sensor data of a vehicle indicative of one or more autonomous driving adversity conditions (STEP 702), executing a machine learning model to predict, determine or prescribe, using the sensor data, a trajectory to be followed by the vehicle through the one or more autonomous driving adversity conditions (STEP 704), and providing an indication of the predicted, determined or prescribed trajectory to an autonomous driving system of the vehicle (STEP 706). The method 700 can be implemented by a vehicle 120 or the SDPL system 110. In other words, the ML model can be deployed in the vehicle(s) 120 or the SDPL system 110.

The method 700 shown in FIG. 7 comprises steps 702-706. However, it should be appreciated that other embodiments may comprise additional or alternative steps or may omit one or more steps altogether as described below. It should also be appreciated that other embodiments may perform certain steps in a different order. Some of steps discussed herein may also be performed simultaneously or near-simultaneously. The method 700 or steps thereof can be executed or performed by the vehicle 120 or the SDPL system 110 and/or components. The method 700 or portions thereof can be implemented as an operation of the vehicle that can be activated or deactivated at different segments of a vehicle trip. The activation/deactivation can be performed manually by an operator of a vehicle or can be performed automatically.

The method 700 can include the vehicle electronic system 300 or the SDPL system 110 receiving sensor data of a vehicle 120 that is traveling on a road (STEP 702). The senor data can be indicative of one or more autonomous driving adversity conditions and can include image data depicting surroundings of the vehicle. For instance, the training data collection component 320 can receive the sensor data from the sensors 216 (e.g., LIDAR system 312 and/or camera device(s) 314) including one or more images depicting the environment or surroundings of the vehicle 120. The training data collection component 320 can send the image data to the SDPL system 110 if the ML model 218 is deployed in the SDPL system 110.

The method 700 can include the vehicle electronic system 300 or the SDPL system 110 executing the ML model(s) 218 to predict, determine or prescribe, using the sensor data (or image data), a trajectory to be followed by the vehicle 120 through the one or more autonomous driving adversity conditions (STEP 704). The processing circuit 202 or 302 can extract a plurality of predefined features from the sensor data (or image data) and feed the extracted features as input to the ML model(s) 218. The features extracted can be similar to the features extracted during the training phase or validation phase of the ML model(s) 218. The ML model(s) 218 can be trained and validated to generate, predict or output a navigation path, navigation parameters or navigation instructions responsive to the input features. Executing the ML model(s) 218 includes generating, predicting, determining, prescribing or outputting a navigation path, navigation parameters or navigation instructions responsive to the input features. Predicting, determining or prescribing the trajectory can include generating a graphical representation of the trajectory projected on the image data. In some implementations, the ML model(s) 218 or the processing circuit 202 or 302 can generate a separate representation of the predicted, determined or prescribed trajectory. In some implementations, predicting, determining or prescribing the trajectory can include the ML model(s) 218 or the processing circuit 202 or 302 determining, generating or providing a sequence of vehicle coordinates representing the vehicle trajectory.

The method 700 can include the processing circuit 202 or 302 providing an indication of the predicted, determined or prescribed trajectory to an autonomous driving system of the vehicle. For example, the image data with the predicted, determined or prescribed trajectory projected thereon can be provided as input to a control system of the vehicle 120, such as the autonomous driving system 318 or another control system in connection with or monitoring the autonomous driving system 318. The autonomous driving system 318 can use the output of the ML model(s) 218 to generate instructions for sending to vehicle control devices or actuators to navigate the vehicle 120 through the tricky condition. In some implementations, the autonomous driving system 318 can receive detailed and ready to use instructions from the ML model(s) 218 and forward the instructions to control devices or actuators to navigate the vehicle 120.

The ML model(s) 218 can be implemented or configured to provide or output navigations paths, navigation parameters and/or navigation instructions at one or many of various levels of granularity or navigation planning. For example, the ML model(s) 218 can provide high level navigation planning where rough directions are provided as output. The ML model(s) 218 may provide mid-level navigation planning where relatively moder detailed direction data or instructions are output. At low-level planning, the ML model(s) 218 may provide detailed or fine-granularity navigation paths, navigation parameters and/or navigation instructions that can be used to navigate vehicles without much further processing or decision making.

In some implementations, the ML model(s) 218 can be configured to detect autonomous driving adversity conditions and predict, determine or prescribe safe navigation paths, navigation parameters or navigation instructions, as discussed above. The processing circuit 202 or 302 can execute the ML model(s) 218 to detect the one or more autonomous driving adversity conditions using the vehicle sensor data and execute the ML model(s) to predict, determine or prescribe the navigation trajectory, navigation parameter or navigation instructions responsive to detecting the one or more autonomous driving adversity conditions. For instance, the processing circuit 202 or 302 can execute a first ML model of the ML model(s) 218 to determine the presence or absence of an autonomous driving adversity condition. If an autonomous driving adversity condition is detected, the processing circuit 202 or 302 can execute a second ML model of the ML model(s) 218 to predict, determine or prescribe the navigation trajectory, navigation parameter or navigation instructions responsive. Otherwise, the second ML model is not executed.

In some implementations, the processing circuit 202 or 302 can receive an indication that a second trajectory determined by the autonomous driving system is associated with a potential collision and execute the ML model(s) 218 to predict, determine or prescribe the navigation trajectory, navigation parameters or navigation instructions responsive to receiving the indication that the second trajectory is associated with the potential collision. In other words, the autonomous driving system 318 or some other control system can send an indication to the processing circuit 202 or 302 that a navigation trajectory (or navigation solution) predicted, determined, prescribed or generated by the autonomous driving system 318 may not be a safe navigation solution. In response, the processing circuit 202 or 302 can execute the ML model(s) 218 to predict, determine, prescribe or provide a navigation trajectory, navigation parameters or navigation instructions that can be used by the autonomous driving system 318 as an alternative approach or to improve its own navigation solution.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for determining a safe driving trajectory for an autonomous vehicle in adversity conditions, comprising:

acquiring, by a server computer system including one or more processors, vehicle sensor data for a plurality of driving events, the vehicle sensor data acquired by a plurality of autonomous vehicles, the vehicle sensor data including a first subset of the vehicle sensor data associated with autonomous driving adversity conditions and a second subset of the vehicle sensor data associated with autonomous driving non-adversity conditions, the vehicle sensor data including, for each driving event, corresponding image data depicting surroundings of the vehicle and corresponding inertial measurement data, the inertial measurement data indicating positions of the vehicle, wherein the autonomous driving adversity conditions include conditions that increase a likelihood of failure for an autonomous driving system of an autonomous vehicle in determining a safe driving path trajectory;

acquiring, by the server computer system, for each driving event of the plurality of driving events, corresponding vehicle positioning data indicative of a corresponding trajectory followed by the vehicle, based at least in part on the inertial measurement data;

training, by the server computer system, using at least the first subset of the vehicle sensor data and the vehicle positioning data, one or more machine learning models to predict navigation trajectories during the autonomous driving adversity conditions, training the one or more machine learning models to predict the navigation trajectories further comprising:

extracting first features from the vehicle sensor data;

predicting, using the one or more machine learning models, the navigation trajectories, based on the first features;

comparing the predicted navigation trajectories with the inertial measurement data; and updating parameters of the one or more machine learning models, based on the comparison; and training, by the server computer system, using the first subset and the second subset of the vehicle sensor data, the one or more machine learning models to detect the autonomous driving adversity conditions, training the one or more machine learning models to detect the autonomous driving adversity conditions further comprising:

extracting second features from training data;

predicting, by the one or more machine learning models, an indication whether a vehicle environment associated with the training data is an autonomous driving adversity condition, based on the extracted second features;

comparing the predicted indication with a corresponding label of the training data; and updating the parameters of the one or more machine learning models, based on the comparison.

2. The method of claim 1, comprising training, by the computer system, using the vehicle sensor data and the vehicle positioning data, the one or more machine learning models to detect the autonomous driving adversity conditions.

3. The method of claim 1, further comprising:

projecting, by the computer system, for each driving event of the plurality of driving events, a graphical representation of the corresponding trajectory followed by the vehicle on the corresponding image data depicting the surroundings of the vehicle; and using, by the computer system, trajectories followed by the vehicle projected on image data for the plurality of driving events to train the one or more machine models.

4. The method of claim 1, wherein the image data includes at least one of images captured by a camera of the vehicle or images captured by a light detection and ranging (LIDAR) system of the vehicle.

5. The method of claim 1, wherein the autonomous driving adversity conditions include at least one of:
a road work zone or a construction zone;
obscured or missing road markings; or
one or more obstacles on or alongside a road segment traveled by the vehicle.

6. The method of claim 1, wherein the vehicle positioning data includes at least one of:
data indicative of interactions of an individual operating the vehicle with driving control devices of the vehicle; or
data captured by positioning sensors of the vehicle.

7. The method of claim 1, wherein at least a subset of the plurality of driving events is associated with an individual operating the vehicle disabling an autonomous driving mode of the vehicle.

8. The method of claim 1, wherein the one or more machine learning models include at least one of:
a neural network;
a random forest;
a statistical classifier;
a Naïve Bayes classifier; or
a hierarchical clusterer.

9. The method of claim 1, wherein training the one or more machine learning models to predict navigation trajectories includes training the one or more machine learning models to provide control instructions to navigate the vehicle through a predicted trajectory.

10. A system for determining a safe driving trajectory for an autonomous vehicle in adversity conditions comprising:
at least one processor; and
a non-transitory computer readable medium storing computer instructions, which when executed cause the system to:
acquire vehicle sensor data for a plurality of driving events, the vehicle sensor data including a first subset of the vehicle sensor data associated with autonomous driving adversity conditions and a second subset of the vehicle sensor data associated with autonomous driving non-adversity conditions, the vehicle sensor data including, for each driving event, corresponding image data depicting surroundings of the vehicle and corresponding inertial measurement data, the inertial measurement data indicating positions of the vehicle, wherein the autonomous driving adversity conditions include conditions that increase a likelihood of failure for an autonomous driving system of an autonomous vehicle in determining a safe driving path trajectory;
acquire, for each driving event of the plurality of driving events, corresponding vehicle positioning data indicative of a corresponding trajectory followed by the vehicle, based at least in part on the inertial measurement data;
train, using at least the first subset of the vehicle sensor data and the vehicle positioning data, one or more machine learning models to predict navigation trajectories during the autonomous driving adversity conditions, train the one or more machine learning models to predict the navigation trajectories further comprising:
extract first features from the vehicle sensor data;
predict, using the one or more machine learning models, the navigation trajectories, based on the first features;
compare the predicted navigation trajectories with the inertial measurement data; and update parameters of the one or more machine learning models, based on the comparison; and
train, using the first subset and the second subset of the vehicle sensor data, the one or more machine learning models to detect the autonomous driving adversity conditions.

11. The system according to claim 10, wherein the computer instructions further cause the system to train, using the vehicle sensor data and the vehicle positioning data, the one or more machine learning models to detect the autonomous driving adversity conditions.

12. The system of claim 10, wherein the computer instructions further cause the system to:
project, for each driving event of the plurality of driving events, the corresponding trajectory followed by the vehicle on the corresponding image data depicting the surroundings of the vehicle; and
use trajectories followed by the vehicle projected on image data for the plurality of driving events to train the one or more machine learning models.

13. The system of claim 10, wherein the image data includes at least one of images captured by a camera of the vehicle or images captured by a light detection and ranging (LIDAR) system of the vehicle.

14. The system of claim 10, wherein the autonomous driving adversity conditions include at least one of:
a road work zone or a construction zone;
obscured or missing road markings; or
one or more obstacles on or alongside a road segment traveled by the vehicle.

15. The system of claim 10, wherein the vehicle positioning data includes at least one of:
data indicative of interactions of an individual operating the vehicle with driving control devices of the vehicle; or
data captured by positioning sensors of the vehicle.

16. The system of claim 10, wherein at least a subset of the plurality of driving events is associated with an individual operating the vehicle disabling an autonomous driving mode of the vehicle.

17. The system of claim 10, wherein in training the one or more machine learning models to predict navigation trajectories, the computer instructions cause the system to train the one or more machine learning models to provide control instructions to navigate the vehicle through a predicted trajectory.

18. A non-transitory computer-readable medium for determining a safe driving trajectory for an autonomous vehicle in adversity conditions, the computer-readable medium comprising computer instructions, the computer instructions when executed by one or more processors cause the one or more processors to:
acquire vehicle sensor data for a plurality of driving events, the vehicle sensor data including a first subset of the vehicle sensor data associated with autonomous driving adversity conditions and a second subset of the vehicle sensor data associated with autonomous driving non-adversity conditions, the vehicle sensor data including, for each driving event, corresponding image data depicting surroundings of the vehicle and corresponding inertial measurement data, the inertial measurement data indicating positions of the vehicle, wherein the autonomous driving adversity conditions include conditions that increase a likelihood of failure for an autonomous driving system of an autonomous vehicle in determining a safe driving path trajectory;

acquire, for each driving event of the plurality of driving events, corresponding vehicle positioning data indicative of a corresponding trajectory followed by the vehicle, based at least in part on the inertial measurement data;

train, using at least the first subset of the vehicle sensor data and the vehicle positioning data, one or more machine learning models to predict navigation trajectories during the autonomous driving adversity conditions, train the one or more machine learning models to predict the navigation trajectories further comprising:

extract features from the vehicle sensor data;

predict, using the one or more machine learning models, the navigation trajectories, based on the extracted features;

compare the predicted navigation trajectories with the inertial measurement data; and update parameters of the one or more machine learning models, based on the comparison; and train, using the first subset and the second subset of the vehicle sensor data, the one or more machine learning models to detect the autonomous driving adversity conditions.

19. The non-transitory computer-readable medium of claim 18, wherein the one or more machine learning models include at least one first machine learning model and at least one second machine learning model, wherein the at least one first machine learning model is separate from the at least one second machine learning model, and wherein the computer instructions when executed by one or more processors cause the one or more processors to:

train, using at least the first subset of the vehicle sensor data and the vehicle positioning data, the at least one first machine learning model to predict navigation trajectories during the autonomous driving adversity conditions; and train, using the first subset and the second subset of the vehicle sensor data, the at least one second machine learning model to detect the autonomous driving adversity conditions.

20. The system of claim 10, wherein the computer instructions further cause the system to:

train the one or more machine learning models to detect the autonomous driving adversity conditions by:

extracting second features from training data;

predicting, by the one or more machine learning models, an indication whether a vehicle environment associated with the training data is an autonomous driving adversity condition, based on the extracted second features;

comparing the predicted indication with a corresponding label of the training data; and updating the parameters of the one or more machine learning models, based on the comparison.

\* \* \* \* \*